United States Patent [19]

Stürzinger

[11] 3,888,631
[45] June 10, 1975

[54] TEMPERATURE INDICATOR

[76] Inventor: Oskar Edwin Stürzinger, Kirchmattweg 6, Baar, Switzerland

[22] Filed: Apr. 8, 1974

[21] Appl. No.: 458,822

[30] Foreign Application Priority Data
Apr. 12, 1973 Switzerland.......................... 5288/72

[52] U.S. Cl. ........ 23/253 TP; 116/114 AM; 426/88
[51] Int. Cl. ... G01k 1/02; G01k 3/00; G01k 11/00; G01n 21/06
[58] Field of Search.................... 23/253 TP; 426/88; 116/114 AM

[56] References Cited
UNITED STATES PATENTS
3,695,903  10/1972  Telkes et al..................... 23/253 TP Primary Examiner—R. E. Serwin
Attorney, Agent, or Firm—Ostrolenk, Faber, Gerb & Soffen

[57] ABSTRACT

A temperature indicator or monitor for deep frozen products, comprising paper-like fibrous material containing a binder and two water soluble colorless reagents. At least one of the reagents is encapsulated in microcapsules in the form of an aqueous solution which is still liquidous below 0°C, and wherein such reagent upon rupture of the capsules, which occurs at a temperature range in the order of 4°C to 0°C, combines with the other reagent to form a dye which permeates the fibers of the paper-like fibrous material and contrasts with its basic color.

3 Claims, No Drawings

TEMPERATURE INDICATOR

BACKGROUND OF THE INVENTION

The present invention relates to a new and improved temperature monitor or indicator for deep frozen products.

Nowadays a very large proportion of foodstuffs are processed by the food packaging industry in the form of deep frozen products. These can be stored over a longer period of time provided that measures are taken to insure that a minimum boundary or threshold temperature is not exceeded.

During the transport and transfer of these deep frozen products, it is oftentimes difficult to avoid subjecting such foodstuffs for a shorter or longer time span to temperatures which exceed the permissible threshold value. Upon subsequent restorage of these products in a deep frozen state, there is no indication that possibly such products have been exposed to impermissible temperatures. Only the final consumer will be able to determine whether in such cases the permissible boundary temperature has been exceeded, leading to spoiling of the foodstuff or product.

The prevailing problem is the determination of the effect of the ambient temperatures upon the foodstuffs or products. Rapid transfer of the product from one refrigerated transport car to a deep freezer generally does not have any adverse effect upon the product since its package normally possesses a sufficiently great insulation under these circumstances. However, if a shipment remains for a longer period of time, for instance, on the road or loading ramp and is exposed to the intensive rays of the sun, then the foodstuffs or products in question can become damaged. Yet, when these products are again cooled during subsequent storage thereof the product package does not provide any indication as to the reliability of the handling of such products during shipment or otherwise by the shipping personnel.

OBJECTS OF THE INVENTION

Hence, it is a primary object of the present invention to provide a temperature monitor or indicator for deep frozen products which overcomes this drawback.

Another object of the invention relates to an improved construction of temperature indicator which allows the final consumer as well as the control personnel of the distributor, without having to open the package, to instantaneously recognize whether a certain critical temperature has been exceeded for a certain time, and which could be harmful for the product or the like being monitored.

Yet a further significant object of the present invention aims at the provision of a temperature indicator for refrigerated products, especially deep frozen foodstuffs or the like, which permits visually ascertaining quickly and reliably whether the product in question has been subjected to temperatures which might have caused spoiling thereof.

DETAILED DESCRIPTION OF THE INVENTION

Now in order to implement the aforementioned objects and others which will become apparent as the description proceeds, the invention provides an improved construction of temperature indicator or monitor for deep frozen products comprising a paper-like material, preferably applied to the outside of the package for the foodstuff or other product to be controlled, or if desired, supported to be clearly visible beneath a transparent foil or the like.

The temperature indicator of this development which contains paper-like fibrous material, a binder and two water soluble colorless reagents, is manifested by the features that at least one of the reagents is packaged as an aqueous solution in microcapsules, the reagent still being in a liquid state beneath 0°C, and upon rupture or bursting of such microcapsules, which occurs at a temperature range in the order of 4°C to 0°C, such reagent combines with the other reagent into a dye which permeates the fibers and contrasts with the basic color thereof.

Microcapsules are used at the present time, for instance, for carbonless copy paper sets or ribbonless typewriter or recording systems. In such environment of use these microcapsules are filled with a colorless reagent which, upon contact with another material or substance with which the paper fibers are imbued (or which are located in other capsules) combine into a visible color dye or pigment.

When pressure is exerted during handwriting or upon striking of the typewriter or recorder keys, the microcapsules burst and at the relevant locations there appears the writing in color.

The aqueous solution contained in the microcapsules is one which preferably first freezes at about −18°C. The second colorless reagent either can have added thereto the binder, or it also can be provided with an aqueous solution which through the addition of, for instance, alcohol or glycerine can be brought to the previously mentioned freezing point and likewise filled into microcapsules.

As is well known, water is the only substance which expands in a temperature range of 4°C to 0°C. During deep freezing of the products, the microcapsules containing the aqueous solutions will burst. Both of the reagents come into contact with one another at the paper fibers and react such that there appear visible color or dye spots. Since however, the freezing process occurs very rapidly (as a general rule there are employed in industry temperatures of −60°C), this reaction only can occur over a very brief time span. As soon as a temperature of −18°C has been reached, at least one of the liquids solidifies and the reactions are stopped. As long as the food product or otherwise is stored at a temperature below −18°C, this condition does not change. If however, storage occurs above such temperature, depending upon the heat and time span of the action, there is again present the possibility of liquification and subsequent reaction of both color or dye components. The color spots or dots become larger until a maximum value has been reached where the entire strip is colored or dyed through.

If the products are only exposed to a greater temperature for a short time which is not harmful to the products, e.g. foodstuffs, then at certain locations the original spots which are hardly visible will become somewhat larger in size; during each refrigerated storage of the products the reaction immediately is stopped.

The manufacturer of the food products or otherwise can give instructions on the basis of statistical evaluations to the control or checking personnel as well as to the final consumer at which spot size an immediate consumption or use of the product has been indicated, at which a shorter or longer refrigerated or deep-frozen storage can still be tolerated, or when the product in question has become spoiled. In practice the final consumer preferably can compare the spot size with the size of reference spots or markers.

The temperature indicator or monitor of this development is simple in construction and design and inexpensive to fabricate. Nowadays almost all liquids can be encapsulated on an industrial basis, so that the proposed invention consitutes an extremely economical solution of the problem since in the office equipment industry, the production of paper with microcapsules has been carried out throughout the world for many years.

While there is shown and described present preferred embodiments of the invention, it is to be distinctly understood that the invention is not limited thereto, but may be otherwise variously embodied and practiced within the scope of the following claims.

What is claimed is:

1. A temperature indicator for deep frozen products comprising a paper-like fibrous material containing a binder and two water soluble colorless reagents which react chemically when both reagents are liquid to produce a dye which imbues the fibers with a color which contrasts with the basic color of the fibrous material, at least one of the reagents being present in the form of a microencapsulated aqueous solution thereof, the solution being in the liquid state at a temperature below 0°C. and having a predetermined sub-zero freezing point, the microcapsules adapted to burst at a temperature of 4°C. to 0°C. as a result of the volume expansion of the water in the aqueous solution and permit the reagents to react to produce the dye until the temperature has been lowered to a point where at least one of the reagents freeze.

2. The temperature indicator as defined in claim 1, wherein the aqueous solution freezes at a temperature of about $-18°C$, so that the chemical reaction is stopped at such temperature.

3. The temperature indicator as defined in claim 1, wherein both reagents are contained in microcapsules.

* * * * *